United States Patent
Moody et al.

(10) Patent No.: US 9,321,647 B2
(45) Date of Patent: Apr. 26, 2016

(54) POLYCRYSTALLINE ALUMINUM NITRIDE MATERIAL AND METHOD OF PRODUCTION THEREOF

(71) Applicant: HEXATECH, INC., Morrisville, NC (US)

(72) Inventors: Baxter Moody, Raleigh, NC (US); Rafael Dalmau, Raleigh, NC (US); David Henshall, Raleigh, NC (US); Raoul Schlesser, Raleigh, NC (US)

(73) Assignee: HEXATECH, INC., Morrisville, NC (US)

( * ) Notice: Subject to any disclaimer, the term of this patent is extended or adjusted under 35 U.S.C. 154(b) by 0 days.

(21) Appl. No.: 14/615,742

(22) Filed: Feb. 6, 2015

(65) Prior Publication Data

US 2015/0151968 A1   Jun. 4, 2015

Related U.S. Application Data

(62) Division of application No. 13/185,544, filed on Jul. 19, 2011, now Pat. No. 8,974,726.

(60) Provisional application No. 61/365,976, filed on Jul. 20, 2010.

(51) Int. Cl.
   *C04B 35/581* (2006.01)
   *C01B 21/072* (2006.01)
   *C04B 35/64* (2006.01)

(52) U.S. Cl.
   CPC ............ *C01B 21/072* (2013.01); *C04B 35/581* (2013.01); *C04B 35/64* (2013.01); *C04B 2235/5409* (2013.01); *C04B 2235/5436* (2013.01); *C04B 2235/5445* (2013.01); *C04B 2235/5481* (2013.01); *C04B 2235/604* (2013.01); *C04B 2235/656* (2013.01); *C04B 2235/658* (2013.01); *C04B 2235/6562* (2013.01); *C04B 2235/6565* (2013.01); *C04B 2235/6567* (2013.01); *C04B 2235/6581* (2013.01); *C04B 2235/6586* (2013.01); *C04B 2235/66* (2013.01); *C04B 2235/72* (2013.01); *C04B 2235/77* (2013.01); *C04B 2235/94* (2013.01); *C04B 2235/95* (2013.01); *C04B 2235/963* (2013.01); *Y10T 428/24355* (2015.01)

(58) Field of Classification Search
   CPC ................ C04B 14/326; C04B 35/581; C04B 2235/3865

USPC ......................................................... 264/668
   See application file for complete search history.

(56) References Cited

U.S. PATENT DOCUMENTS

| | | | |
|---|---|---|---|
| 4,478,785 A | 10/1984 | Huseby et al. | |
| 4,578,232 A | 3/1986 | Huseby et al. | |
| 4,578,233 A | 3/1986 | Huseby et al. | |
| 4,578,234 A | 3/1986 | Huseby et al. | |
| 4,719,187 A | 1/1988 | Bardhan et al. | |
| 4,908,173 A | 3/1990 | Schwetz et al. | |
| 4,952,535 A | 8/1990 | Merkel | |
| 5,320,990 A | 6/1994 | Guiton et al. | |
| 5,541,145 A | 7/1996 | Harris et al. | |
| 5,744,411 A | 4/1998 | Zhao et al. | |
| 5,773,377 A | 6/1998 | Harris et al. | |
| 6,313,441 B1 | 11/2001 | Schaper et al. | |
| 6,315,945 B1 | 11/2001 | Macki et al. | |
| 6,423,400 B1 | 7/2002 | Yushio et al. | |
| 6,723,274 B1 | 4/2004 | Divakar | |
| 7,369,393 B2 | 5/2008 | Zandi et al. | |
| 7,799,269 B2 | 9/2010 | Wei et al. | |
| 2005/0231887 A1 | 10/2005 | Zandi et al. | |
| 2006/0154827 A1 | 7/2006 | Kanechika et al. | |
| 2007/0131160 A1 | 6/2007 | Slack et al. | |
| 2007/0243653 A1 | 10/2007 | Morgan et al. | |
| 2007/0289946 A1 | 12/2007 | Schowalter et al. | |
| 2010/0314551 A1 | 12/2010 | Bettles et al. | |

FOREIGN PATENT DOCUMENTS

| | | |
|---|---|---|
| EP | 0 940 845 A2 | 8/1999 |
| JP | S63-129075 | 6/1988 |
| JP | H01-160873 | 6/1989 |
| JP | H01-224269 | 9/1989 |
| JP | 9110405 | 4/1997 |
| JP | 2000-058631 | 2/2000 |
| JP | 2005335992 | 12/2005 |
| JP | 2007327125 | 12/2007 |
| JP | 2009-532313 | 9/2009 |

*Primary Examiner* — Russell Kemmerle, III
(74) *Attorney, Agent, or Firm* — Womble Carlyle Sandridge & Rice, LLP

(57) ABSTRACT

Methods of preparing polycrystalline aluminum nitride materials that have high density, high purity, and favorable surface morphology are disclosed. The methods generally comprises pressing aluminum nitride powders to form a slug, sintering the slug to form a sintered, polycrystalline aluminum nitride boule, and optionally shaping the boule and/or polishing at least a portion of the boule to provide a finished substrate. The sintered, polycrystalline aluminum nitride materials beneficially are prepared without the use of any sintering aid or binder, and the formed materials exhibit excellent density, AlN purity, and surface morphology.

12 Claims, No Drawings

POLYCRYSTALLINE ALUMINUM NITRIDE MATERIAL AND METHOD OF PRODUCTION THEREOF

CROSS-REFERENCE TO RELATED APPLICATIONS

The present application is a division of U.S. patent application Ser. No. 13/185,544, filed Jul. 19, 2011, which claims priority to U.S. Provisional Application No. 61/365,976, filed Jul. 20, 2010, the disclosures of which are incorporated herein by reference in their entirety.

FIELD OF THE INVENTION

The present invention relates to polycrystalline aluminum nitride substrates and methods of preparing such substrates. More particularly, the invention provides methods of preparing polycrystalline aluminum nitride substrates of high relative density without the use of binder agents, the substrates exhibiting physical characteristics suitable for use in various materials, such as thin film applications.

BACKGROUND

Polycrystalline aluminum nitride substrates are useful in many different fields, such as construction materials in high-temperature machinery and in various electronic devices. They are typically recognized as providing valuable properties including high strength, oxidation resistance, thermal shock resistance, high thermal conductivity, low electrical conductivity, and resistance to corrosion by liquid metals. The properties of polycrystalline aluminum nitride substrates, however, can be altered by the presence of impurities, such as oxygen, carbon, and metals.

Polycrystalline aluminum nitride substrates typically have been prepared by high pressure, high temperature sintering processes. It has been recognized in the art, however, that sintering aids or binders are required to form useful substrates. For example, known methods have required the use of high oxygen content aluminum nitride powder (i.e., a low purity AlN powder) or have required the addition of sintering aids or binders, such as metal oxides, metal nitrides, and metal hydrides—e.g., aluminum oxide ($Al_2O_3$), yttrium oxide ($Y_2O_3$), calcium oxide (CaO), barium oxide (BaO), strontium oxide (SrO), lithium oxide ($Li_2O$), lithium yttrium oxide ($LiYO_2$), boron nitride (BN), calcium nitride ($Ca_3N_2$), strontium nitride ($Sr_3N_2$), barium nitride ($Ba_3N_2$), calcium hydride ($CaH_2$), strontium hydride ($SrH_2$), and barium hydride ($BaH_2$).

Sintering aids typically are included in polycrystalline aluminum nitride substrates to achieve acceptable density at lower sintering temperatures by reducing the sintering activation energy or to increase density at higher temperature than would otherwise be possible. Binders typically are recognized as additives that can help hold powders together as they are pressed. In most cases, some content of the binder is burned away during the heating that leads up to the sintering process.

While sintering aids and binders can facilitate formation of polycrystalline structures, the formed structures can have reduced benefit. For example, the addition of oxides can adversely affect thermal conductivity, and uneven sintering can occur with the addition of many sintering aids. The use of sintering aids also can prevent formation of dense polycrystalline substrates having particularly desirable surface morphologies. Likewise, incomplete binder removal during heating can interfere with sintering and result in low final density. Thus, there remains a need in the art for further methods of preparing polycrystalline aluminum nitride materials and for the provision of such materials having particularly desirable surface morphologies.

SUMMARY OF THE INVENTION

The present invention provides methods of preparing polycrystalline aluminum nitride substrates and provides polycrystalline aluminum nitride substrates having specific characteristics. The substrates provided according to the invention particularly can be useful for thin film deposition and/or substrates in the manufacturing of various electronic devices and materials.

Thus, in one aspect, the invention provides methods of preparing a polycrystalline aluminum nitride material having defined properties. In certain embodiments, the method can comprise pressing aluminum nitride powders to form a pressed aluminum nitride slug and sintering the slug, preferably in the absence of a binder or sintering aid to form a sintered aluminum nitride material or boule. In further embodiments, at least a portion of the sintered boule can be shaped and/or polished to provide the polycrystalline aluminum nitride substrate having specific characteristics. In some embodiments, the pressing step can comprise cold isostatic pressing. Preferably, pressing may be carried out at a pressure in the range of about 20,000 PSI (about 138 MPa) to about 40,000 PSI (about 276 MPa). More particularly, cold isostatic pressing may be carried out by increasing the pressure at a defined rate. For example, pressure may be raised from atmospheric pressure at a rate of about 5,000 PSI/minute (57.5 KPa/s) to achieve a defined maximum pressure. Thereafter, the pressure can be reducing to atmospheric pressure, which also may be carried out at a defined rate.

In other embodiments, it can be useful for the aluminum nitride powder to have a minimum purity level (i.e., the amount of the total weight of the powder formed by aluminum nitride separate from impurities, such as other metals, oxygen, and carbon). Particularly, the aluminum nitride powder can have a purity of at least about 98% by weight, preferably at least about 99% by weight. Likewise, it can be preferable for the sintered polycrystalline aluminum nitride boule and/or substrate to have a similar purity.

Sintering of the pressed slug can be carried out at a specific temperature, such as a temperature of at least about 1,500° C. Sintering temperature may be provided in a ramping process where specific temperatures are achieved and held for defined times. Such heating can proceed according to one or more defined heating algorithms, as further discussed herein. Moreover, it is preferred for sintering to take place in a non-oxidizing atmosphere, such as a nitrogen atmosphere.

The sintered aluminum nitride boule may be prepared as a bulk product that can be an actual end product for sale, or the boule may be directed to other processes to further refine the material. Specifically, at least a portion of the boule can be subjected to polishing, or the boule can undergo one or more intermediate steps. For example, the sintered aluminum nitride boule may desirably be reduced in size and/or altered in shape. Specifically, the sintered aluminum nitride boule may be ground to a desired shape and/or dimensions. Moreover, the sintered aluminum nitride boule may be cut or otherwise processed to form specific, smaller aluminum nitride pieces (e.g., wafers) that proceed to the polishing step. The method is particularly beneficial in that the finally prepared polycrystalline aluminum nitride substrate exhibits highly useful characteristics. For example, the polycrystalline aluminum nitride substrate can have a relative density of at least about 98%, a purity of at least about 98% by weight, an rms surface roughness of less than about 80 nm, and a defect density of less than about 1,000 cm$^{-2}$. The substrate (as well as the boule) also can exhibit a variety of thickness and further dimensions that exceed dimensions typically obtainable by known methods.

Such characteristics make the inventive polycrystalline aluminum nitride substrates particularly useful in a variety of commercial applications. For example, the invention can encompass articles of manufacture that would be understood to comprise in total or in part a polycrystalline aluminum nitride material. In specific embodiments, such articles can include heat sinks (i.e., a component or assembly that transfers heat generated within a solid material to a fluid medium). As such, the invention would encompass electronic and optoelectronic devices, such as lasers and light emitting diodes (LEDs), that may incorporate a heat sink component. In further embodiments, the articles can include electrical insulator parts, particularly parts used in electronic and microelectronic components and articles. In other embodiments, the articles can include handle wafers, carrier wafers, and layer transfer substrates. Thus, the inventive articles can encompass materials used in semiconductor manufacturing for the preparation, temporary mounting, or permanent mounting of specific semiconductor layers. In still further embodiments, the inventive polycrystalline aluminum nitride substrates may be included in articles related to classical ceramic applications, such as crucibles. More particularly, an article of manufacture comprising a polycrystalline aluminum nitride substrate according to the invention may be selected from the group consisting of electronic devices, microelectronic devices, optoelectronic devices, and telecommunication devices. Specific, non-limiting examples of articles that may incorporate a polycrystalline aluminum nitride material according to the invention include components for lasers (such as excimer, solid state, helium-neon, argon, ion, carbon dioxide, and copper vapor lasers), laser diodes, heat spreaders, detectors (e.g., ultraviolet and infrared detectors), capacitors, optical storage media, electronic substrates, chip carriers, fiber optic switches, fiber optic connectors, antennas, transmitters, and the like.

In preferred embodiments, the method of the invention can be characterized further in light of specific processing parameters and/or the specific nature of the materials used and/or prepared. For example, the aluminum nitride powder used to prepare the polycrystalline sintered substrate can have a defined particle size that can be correlated to a defined total surface area. Specifically, the powder may have a surface area in the range of about 1 m$^2$/g to about 10 m$^2$/g.

In other aspects, the invention particularly can be characterized in relation to polycrystalline aluminum nitride materials having specific characteristics. In some embodiments, the invention provides a polycrystalline aluminum nitride boule and/or substrate (e.g., a wafer) having a relative density of at least about 98% and a purity of at least about 98% by weight. Further, the boule and/or the substrate may exhibit an rms surface roughness of less than about 80 nm and a defect density of less than about 1,000 cm$^{-2}$. In further embodiments, the inventive polycrystalline aluminum nitride substrate can be characterized by further combination of specific physical and chemical properties. Specifically, the inventive polycrystalline aluminum nitride substrate can be distinguished by the surprisingly desirable surface morphology that is not typically seen in polycrystalline aluminum nitride materials. Moreover, the inventive polycrystalline aluminum nitride substrates can be characterized in relation to their high purity, which can be attributed in part to the complete absence of any sintering aids or binders. Since such materials are not required in the methods of preparation described herein, the inventive substrates can particularly be described as being free of even residual amounts of materials that may be used as binders or sintering aids. Still further, the inventive materials can be characterized by the increased sizes and the variety of three-dimensional shapes in which the substrates may be provided. Of course, the nature of the methods and materials of the present invention are described in greater detail below and are not limited to the exemplary embodiments discussed above.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In light of the usefulness of aluminum nitride substrates in a variety of materials and methods, there have been many previous attempts to provide a source of such substrates. Because of the strict physical and chemical requirements associated with the various methods used, however, the ability to provide high quality materials has heretofore been somewhat limited. For example, for use with highly sensitive materials, single crystal aluminum nitride substrates can be preferred because of the uniformity of structure of the material (i.e., a practically 100% dense aluminum nitride material is provided).

Polycrystalline aluminum nitride substrates can be prepared from aluminum nitride powders, but polycrystalline materials have heretofore seen limited use because of matters such as low relative density, low AlN purity, and/or unacceptable surface morphology. In various embodiments, the present invention overcomes such problems in the art and provides polycrystalline aluminum nitride materials that are close to 100% dense, can exhibit very high purity, can be prepared in relatively large sizes and three-dimensional configurations, and can provide desirable surface morphologies making the polycrystalline aluminum nitride materials useful in a variety of applications, including thin film applications where highly smooth surface substrates are required.

Initially, it should be noted that the use of the word "substrate" herein should not be viewed as limiting the scope of the invention. The inventive method described herein can provide the initial formation of a pressed and sintered polycrystalline aluminum nitride bulk material that may be characterized as a "boule". This boule can proceed to further processing as desired to shape the material and/or polish at least a portion of the material. A "substrate", as used herein, is intended to refer to a polycrystalline aluminum nitride material that has completed processing (including any shaping and/or polishing that may be desired) and is essentially in a form for use by itself or in an article of manufacture. More specifically, the substrate may be useful as a support layer in various electronic applications; however, the substrate is not necessarily limited to such use. Further, in some embodiments, a substrate may be modified prior to actual use by a consumer (e.g., a relatively large wafer that is polished and ready for use could be cut into smaller wafers that optionally could undergo further polishing, if desired). Polycrystalline aluminum nitride substrates according to the invention may be essentially flattened in shaped (e.g., relatively thin, particularly in relation to other dimensions, such as diameter, length, or width) and, as such, may particularly refer to wafers or the like. Polycrystalline aluminum nitride substrates according to the invention likewise, however, may have further three-dimensional shapes wherein the substrate is not essentially flattened in one dimension (e.g., is relatively thick). Reference to a polycrystalline aluminum nitride material may encompass pressed slugs, sintered boules, and/or finally prepared substrates that may be thin wafers or may take on a variety of three-dimensional configurations and sizes, as may be desirable for use in an article of manufacture or in a method of preparing an article of manufacture.

Relative density is understood to be a comparative term whereby the density of a polycrystalline material (in mass per unit volume) is compared to the theoretical, 100% density of the material. For example, a single crystal AlN material may be used as a 100% dense basis for evaluating relative density a polycrystalline AlN material. Sintered materials typically are less than 100% dense because of internal porosity and surface porosity. It is preferable, however, for an aluminum nitride substrate to be as close to 100% dense as possible. In the present invention, the aluminum nitride substrates prepared by the described methods can exhibit a relative density of at least about 95%, at least about 98%, at least about 99%, at least about 99.5%, or at least about 99.8%.

The present invention preferably utilizes aluminum nitride powders having a desired purity (i.e., are substantially free of impurities, such as other metals, carbon, oxygen, and any other non-aluminum nitride materials). Preferably, the aluminum nitride powders used in the present invention are at least about 98% pure, at least about 98.5% pure, at least about 99% pure, or at least about 99.5% pure.

The ability to achieve highly dense, polycrystalline aluminum nitride substrates has heretofore been limited because it is generally recognized in the art that binders and/or sintering aids are required to produce a technical grade material. For example, typical prior art polycrystalline aluminum nitride substrates are tape-cast, and materials, such as yttria, are usually added (as well as a variety of slurrying materials that may be incompletely removed during sintering). While some content of binders or sintering aids may be removed during the sintering processes, a significant portion of the contaminating materials typically becomes physically and/or chemically included in the formed substrate due to incomplete removal. This is detrimental to formation of a highly dense aluminum nitride substrate that also exhibits high purity. On the contrary, since the present methods do not require the use of binders or sintering aids, the formed polycrystalline aluminum nitride boules are essentially a single-phase product of high purity. Specifically, the inventive polycrystalline aluminum nitride materials can exhibit an AlN purity of at least 98%, at least 98.5%, at least 99%, or at least 99.5% by weight. In some embodiments, the inventive polycrystalline aluminum nitride materials can be characterized as consisting essentially of aluminum and nitrogen or as consisting essentially of aluminum, nitrogen, and oxygen. In further embodiments, the inventive polycrystalline aluminum nitride materials can be characterized in relation to materials that are not present. For example, the inventive, polycrystalline AlN materials may specifically exclude any of the following singly or in any combination: art-recognized sintering aids generally, art-recognized binders generally, metal oxides generally, metal oxides other than aluminum oxide, metal nitrides other than aluminum nitride, metal hydrides generally, metals other than aluminum, yttrium, calcium, barium, strontium, lithium, boron, iron, copper, nickel, zinc, chromium, sodium, potassium, magnesium titanium, vanadium, zirconium, silicon, gallium, indium, carbon, aluminum oxide ($Al_2O_3$), yttrium oxide ($Y_2O_3$), calcium oxide (CaO), barium oxide (BaO), strontium oxide (SrO), lithium oxide ($Li_2O$), lithium yttrium oxide ($LiYO_2$), boron nitride (BN), calcium nitride ($Ca_3N_2$), strontium nitride ($Sr_3N_2$), barium nitride ($Ba_3N_2$), calcium hydride ($CaH_2$), strontium hydride ($SrH_2$), barium hydride ($BaH_2$), organic materials, slurrying aids, organic solvents, and aqueous solvents. Still further, the inventive polycrystalline aluminum nitride materials can be characterized in relation to their physical form. For example, the materials may be characterized as being a pressed powder, a sintered powder, or a pressed and sintered powder. Such characterization should not be construed as merely referring to the method by which the material was prepared since the nature of the material can be characterized as being a conglomeration of powders, and the terms "pressed" and "sintered" denote physical characteristics of the powder in the end material that maintain the powder in the form of a single, solid article.

The inventive polycrystalline aluminum nitride materials further can be characterized in relation to their dimensions. For example, the initially prepared boules and/or the finally prepared substrates after shaping and/or polishing can have a thickness of at least about 0.25 cm, at least about 0.5 cm, at least about 1.0 cm, at least about 2.0 cm, at least about 5.0 cm, at least about 8.0 cm, at least about 10.0 cm, or at least about 15 cm. In other embodiments, thickness can be about 0.1 cm to about 25 cm, about 0.2 cm to about 20 cm, or about 0.5 cm to about 15 cm. The above values likewise can apply to the diameter or length or width of the initially prepared boule and/or finally prepared substrate. Thus, a boule or substrate according to the invention can take on a variety of three-dimensional shapes of substantially large dimensions in all three directions. By contrast, known polycrystalline aluminum nitride substrates have been limited to relatively small substrates—e.g., thicknesses on the order of only a few millimeters. According to the present invention, inventive polycrystalline aluminum nitride boules and/or substrates can take on three-dimensional shapes wherein all three dimensions can be according to any of the values provided above for thickness.

The use of binders also can be detrimental to the ability to form substrates with particularly desirable surface morphology. For example, surface roughness generally can be a limiting factor for the usefulness of sintered polycrystalline aluminum nitride substrates because low relative density and the use of binder materials can limit the smoothness of the substrate surface, regardless of how much the surface is polished. For example, incomplete sintering can lead to AlN grain pull-out during subsequent processing, such as during polishing, and low relative density can lead to porosities that cause unacceptable surface roughness, particularly on a nanometer scale.

Roughness evaluated on an rms scale is a commonly recognized and often used parameter in the field of optics and other technological fields, such as electronics, where surface specifications are required to be within precise ranges. In determining an rms roughness for a given surface, the surface topography can be represented as a surface profile, $z(x)$. Surface topography is generally a series of peaks and valleys deviating by a certain distance from a mean line. The greater the distance of the peaks and valleys from the mean line, the rougher the surface. In the surface profile, z represents the distance from the mean line at a specific point along the line on the surface being measured, and x represents the number of measurements evaluated to determine rms roughness along the line. Accordingly, rms roughness (Rq) is defined as the root mean square of the deviations of the surface profile, z(x), from the mean line. This is calculated according to the following equation:

$$Rq = \left[\frac{1}{L}\int_0^L z^2(x)\,dx\right]^{1/2}$$

where L is the length of the surface profile along the x-direction. The rms roughness is generally designated by Rq in documentary standards and is often represented in certain fields, such as optics, by the symbol σ. Because surface profiles z(x) are closely approximated in nearly all modern instruments by a digitized set of points $z_i$, the above equation can be replaced in practice by its digital equivalent:

$$Rq = \left[\frac{1}{N}\sum_{i=1}^{N} z_i^2\right]^{1/2}$$

where N is the number of data points in a measured surface profile.

Various profiling techniques are available that are capable of measuring surface roughness in a nanometer scale. Examples of such techniques include stylus-based profiling, phase-shifting interferometric microscopy, Nomarski profiling, and atomic force microscopy (AFM). Of these methods, AFM is often recognized as producing the highest lateral resolution, generally of 1 nm or less. Surface roughness evaluation is further described by Vorburger, T., Fu, J., and Orji, N., "In the Rough", SPIE's *oe Magazine*, 2(3), March 2002, p. 31-34, which is incorporated herein by reference. One example of a device useful in calculating rms roughness is a Dektak 150 Surface Profiler (available from Veeco Instruments, Inc., Plainview, N.Y.).

In specific embodiments, rms roughness may be determined across a defined sampling area. In one embodiment, the sampling area may have dimensions of about 1,000 μm×200 μm Sampling size may vary, but it is preferable that the sampling size be consistent between different samples to ensure a standard characterization of roughness. In some embodiments, sampling size may encompass an area of about 50 mm² to about 500 mm², about 100 mm² to about 300 mm², or about 150 mm² to about 250 mm².

The present invention particularly is useful because of the ability to provide binderless, sintered, polycrystalline aluminum nitride substrates that not only are close to 100% dense but also have surface morphologies (e.g., rms roughness) that are within parameters necessary for use in thin film deposition and other areas where an exceptionally smooth surface is required. In specific embodiments, the polycrystalline aluminum nitride substrates of the present invention can exhibit an rms roughness that is less than about 100 nm, less than about 90 nm, less than about 80 nm, less than about 70 nm, less than about 60 nm, less than about 50 nm, less than about 40 nm, less than about 30 nm, less than about 20 nm, less than about 15 nm, or less than about 10 nm. In specific embodiments, rms surface roughness can be in the range of about 5 nm to about 75 nm, about 5 nm to about 50 nm, about 5 nm to about 25 nm, or about 10 nm to about 25 nm.

In other embodiments, the polycrystalline aluminum nitride substrates of the present invention can be characterized in terms of defect density. A defect can be characterized as any depression present along the substantially smooth surface of the polycrystalline aluminum nitride substrate. For example, a surface defect may be characterized as a "pit" at the surface of a substrate, which can be understood to relate to an undesirable depression having a bottom surface that is vertically lower than the surrounding area of the substrate surface (i.e., is depressed to be lower than the surrounding, average surface). The "pit" further can be defined as being contiguous and as being laterally defined (i.e., as having walls rising up from the bottom surface and terminating at an interface with the surround area of the substrate surface). Quantitatively, a pit according to the invention can be defined in terms of its depth (i.e., distance from the bottom surface of the pit to the surrounding, average surface of the substrate) and its width (i.e., the minimum distance across the pit at the level of the surrounding, average surface of the substrate). Other defects in the substrate surface can be similarly defined in relation to an interruption in the substrate surface extending below the substrate surface. In specific embodiments, a surface defect can be defined as any depression in the substrate surface having a depth of at least about 0.2 μm, at least about 0.5 μm, at least about 1.0 μm, at least about 2 μm, at least about 3 μm, at least about 4 μm, or at least about 5 μm. A defect also can be defined as any depression in the substrate surface having a width of at least about 0.2 μm, at least about 0.5 μm, at least about 0.8 μm, at least about 1 μm, at least about 1.5 μm, or at least about 2 μm. In specific embodiments, a defect can be defined by specific combinations of the depths and widths provided above.

For example, a defect may be defined in various embodiments of the invention as a surface depression having any of the following depth and width combinations: a depth of at least about 0.2 μm and a width of at least about 0.2 μm; a depth of at least about 0.2 μm and a width of at least about 0.5 μm; a depth of at least about 0.2 μm and a width of at least about 1.0 μm; a depth of at least about 0.5 μm and a width of at least about 0.2 μm; a depth of at least about 0.5 μm and a width of at least about 0.5 μm; a depth of at least about 1.0 μm and a width of at least about 1.0 μm; a depth of at least about 1.0 μm and a width of at least about 0.2 μm; a depth of at least about 1.0 μm and a width of at least about 0.5 μm; a depth of at least about 1.0 μm and a width of at least about 2.0 μm; a depth of at least about 2.0 μm and a width of at least about 1.0 μm; a depth of at least about 1.0 μm and a width of at least about 3.0 μm; a depth of at least about 3.0 μm and a width of at least about 1.0 μm; a depth of at least about 5.0 μm and a width of at least about 1.0 μm; a depth of at least about 1.0 μm and a width of at least about 5.0 μm; a depth of at least about 2.0 μm and a width of at least about 3.0 μm; a depth of at least about 2.0 μM and a width of at least about 5.0 μm; a depth of at least about 3.0 μm and a width of at least about 2.0 μm; a depth of at least about 3.0 μm and a width of at least about 3.0 μm; a depth of at least about 3.0 μm and a width of at least about 5.0 μm; or a depth of at least about 5.0 μm and a width of at least about 5.0 μm. Even further combinations of the above widths and depths can be encompassed. Moreover, any of the below described defect density values may be expressly associated with any of the above recitations of width and depth combinations.

In light of the foregoing, the defect density at the substrate surface can be calculated. Defect density thus can be defined as a measure of the number of pits or other defects in the substrate surface over a defined area (e.g., number of defects per square cm). In certain embodiments, polycrystalline aluminum nitride substrates according to the present invention can have a defect density of less than about 10,000 cm$^{-2}$, less than about 5,000 cm$^{-2}$, less than about 2,500 cm$^{-2}$, less than about 1,000 cm$^{-2}$, less than about 800 cm$^{-2}$, less than about 600 cm$^{-2}$, less than about 500 cm$^{-2}$, less than about 400 cm$^{-2}$, less than about 300 cm$^{-2}$, or less than about 200 cm$^{-2}$.

Defect density can be measured using any suitable technique in the art for revealing surface topography with sufficient lateral and vertical resolution. Non-limiting examples include atomic force microscopy (AFM), grazing angle laser reflection, profilometry, optical interferometry (e.g., differential interference contrast (DIC) microscopy), and the like. Defect density particularly may be calculated using optical recognition software to evaluate images of the substrate surface, such as the Image-J software developed by the National Institutes of Health. Combinations of such methods also could be used.

The present invention has realized the ability to achieve formation of sintered, polycrystalline aluminum nitride substrates exhibiting the above-described density, purity, and surface morphology because of the particular method of preparation of the substrate. Such method comprises multiple steps that preferably start with a highly pure aluminum nitride powder and result in an aluminum nitride substrate having a defined, desirable density, a defined, desirable purity, and a surface of defined, desirable morphology. In addition to powder purity, it can be beneficial to use aluminum nitride powders having a specific particle size. In some embodiments, the inventive methods may make use of aluminum nitride powders having a mean particle size of less than about 10 µm, less than about 9 µm, less than about 8 µm, less than about 7 µm, less than about 6 µm, less than about 5 µm less than about 4 µm, less than about 3 µm, or less than about 2 µm. In other embodiments, the mean particle size can be in the range of about 0.1 µm to about 10 µm, about 0.2 µm to about 8 µm, about 0.5 µm to about 5 µm, or about 0.5 µm to about 2 µm. In specific embodiments, the particles may have a defined particle size distribution. For example, the AlN powder may be characterized such that at least about 50%, at least about 60%, at least about 70%, at least about 80%, at least about 90%, at least about 95%, or at least about 99% of the particles by weight have a size in a range defined above. In other embodiments, the AlN powder may be characterized such that at least about 50%, at least about 60%, at least about 70%, at least about 80%, at least about 90%, at least about 95%, or at least about 99% of the particles by weight have a size that varies by less than about 5 µm, less than about 4 µm, less than about 3 µm, less than about 2 µm or less than about 1 µm. As an illustrative example, the AlN powder may be such that at least about 50% by weight of the particles have a size of less than about 10 µm and/or at least about 50% by weight of the particles have a size variance of less than about 5 µm (the illustrative percentages and sizes being replaceable by any of the further described percentages and sizes, as well as percentages and sizes falling within any of the above-described ranges). The invention also may expressly exclude particles of specific sizes from the above ranges in certain embodiments of the invention.

In addition to, or as an alternative to particle size, the aluminum nitride particles used in the inventive methods may be characterized in relation to particle surface area. Particle surface area can vary based upon particle morphology, surface roughness, and particle surface porosity. In certain embodiments, it can be desirable for the aluminum nitride particles used in the present invention to exhibit a defined particle surface area. For example, particle surface area may be at least about 0.5 m$^2$/g, at least about 1.0 m$^2$/g, at least about 1.5 m$^2$/g, at least about 2.0 m$^2$/g, at least about 2.5 m$^2$/g, or at least about 3.0 m$^2$/g. In other embodiments, particle surface area may be about 0.1 m$^2$/g to about 10.0 m$^2$/g, about 0.5 m$^2$/g to about 9.0 m$^2$/g, about 1.0 m$^2$/g to about 8.0 m$^2$/g, about 1.5 m$^2$/g to about 7.0 m$^2$/g, about 2.0 m$^2$/g to about 6.0 m$^2$/g, or about 2.5 m$^2$/g to about 5.0 m$^2$/g.

Choice of particle size can be particularly relevant to the achieved product density, product grain size, and the typical defect sizes of the finished product. Choice of particle surface area on the other hand can influence product purity since increases in surface area can increase the oxidation potential and, therefore, can increase the oxygen content in the final product (i.e., lowering product purity). Accordingly, balancing these two characteristics of the raw material can be contradictory since smaller particles are desirable for increased density, since smaller surface area is desired for increased purity, and since particle size and surface area are generally inversely proportional.

In certain embodiments, the initial step in the manufacturing process comprises pressing the powders to form a pressed aluminum nitride slug. Various pressing methods may be used according to the invention. In certain embodiments, the pressing method can be a method wherein no external heat is applied (i.e., the method is not a hot press sintering method). Of course, it is understood that some heat may be generated internally from the compression of the powders, and such internally generated heat is not considered to be externally applied despite the application of external pressure. Preferably, the pressing step is carried out such that any applied heat is at a temperature of less than about 50° C., less than about 40° C., less than about 30° C., less than about 25° C., less than about 20° C., less than about 15° C., or less than about 10° C. In specific embodiments, the pressing step can be described as being carried out at ambient temperature although the actual heat of the pressed material inherent to the pressing action may exceed ambient temperature (i.e., through heating that is not externally applied).

It also can be useful for the pressing method to achieve a certain maximum pressure, which can be achieved according to a defined pressure rate. For example, in certain embodiments, the pressing method can comprise applying a maximum pressure of at least about 20,000 PSI (138 MPa), at least about 25,000 PSI (172 MPa), at least about 30,000 PSI (207 MPa), at least about 35,000 PSI (241 MPa), or at least about 40,000 PSI (276 MPa). In specific embodiments, the maximum pressure applied can be in the range of about 20,000 PSI (138 MPa) to about 40,000 PSI (276 MPa), about 25,000 PSI (172 MPa) to about 35,000 PSI (241 MPa), or about 30,000 PSI (207 MPa) to about 35,000 PSI (241 MPa).

A particular pressure regimen also may be applied. For example, in some embodiments, the maximum pressure may be achieved relatively rapidly while, in other embodiments, the maximum pressure may be achieved more slowly. In specific embodiments, the maximum pressure can be achieved in a time of less than about 30 minutes, less than about 25 minutes, less than about 20 minutes, or less than about 10 minutes. In other embodiments, the time to achieving maximum pressure may be in the range of about 2 minutes to about 20 minutes, about 5 minutes to about 15 minutes, or about 5 minutes to about 10 minutes.

Similarly, pressure may be applied such that the maximum pressure is achieved at a certain rate. For example, pressure may be applied at a rate of about 1,000 PSI/minute (11.5 KPa/s), about 2,000 PSI/minute (23 KPa/s), about 3,000 PSI/minute (34.5 KPa/s), about 4,000 PSI/minute (46 KPa/s), about 5,000 PSI/minute (57.5 KPa/s), about 6,000 PSI/ minute (69 KPa/s), about 7,000 PSI/minute (80.5 KPa/s), or about 8,000 PSI/minute (92 KPa/s).

In certain embodiments, once the maximum pressure is achieved, it may be maintained for only a relatively short time period. For example, the maximum pressure may be maintained for a time of less than about 1 hour, less than about 45 minutes, less than about 30 minutes, less than about 15 minutes, less than about 10 minutes, less than about 5 minutes, less than about 2 minutes, or less than about 1 minute. In some embodiments, the pressure is released immediately upon reaching the maximum pressure (i.e., is released in a time of less than about 30 seconds, less than about 20 seconds, less than about 10 seconds, or less than about 5 seconds after reaching the maximum pressure).

The rate of pressure release after achieving and maintaining the maximum pressure as described above also may be characteristic of the inventive method. For example, the pressure may be released from the maximum to ambient (e.g., approximately atmospheric pressure) in a relatively short time, such as a time of less than about 2 hours, less than about 1.5 hours, less than about 1 hour, less than about 30 minutes, less than about 15 minutes, less than about 10 minutes, less than about 9 minutes, less than about 8 minutes, less than about 7 minutes, less than about 6 minutes, less than about 5 minutes, less than about 4 minutes, less than about 3 minutes, less than about 2 minutes, or less than about 1 minute. Further, the time to return to atmospheric pressure from the maximum achieved pressure can be about 1 minute to about 2 hours, about 10 minutes to about 1.5 hours, or about 30 minutes to about 1.5 hours.

In specific embodiments, the pressing may be carried out using a cold isostatic press. Cold isostatic pressing typically applies pressure from multiple directions for achieving greater uniformity of compaction and increased shape capability, compared to uniaxial pressing. In one method of carrying out isostatic pressing known as wet-bag isostatic pressing, powder is encased in a rubber sheath that is immersed in a liquid which transmits the pressure uniformly to the powder. In another method known as dry-bag isostatic pressing, rather than immersing the tooling in a fluid, the tooling itself is built with internal channels into which high-pressure fluid is pumped.

In some embodiments, it may be desirable to include additional materials with the aluminum nitride powders in the pressing step. For example, if a doped substrate is desired, a doping agent could be added at this point of the process. In specific embodiments, it is desirable for the aluminum nitride substrate to be as close to 100% pure (i.e., 100% AlN with no impurities) as possible. In such embodiments, the invention would expressly exclude any further materials being introduced into the process. Thus, the method may be described such that the pressing step is carried out on a starting material that consists of aluminum nitride powder. Such language would encompass the use of aluminum nitride powders having at least the purity described herein and would exclude the inclusion of any material other than the aluminum nitride powder and any impurities contained in the powders (i.e., a material consisting of aluminum nitride powder having less than 2% impurities, less than 1.5% impurities, or less than 1% impurities). In other embodiments, the pressing could be carried out using materials consisting of powder comprising aluminum nitride. Preferably, the powder would have at least the purity described herein (i.e., a powder comprising at least 98% pure aluminum nitride). While embodiments of the invention may provide close to 100% AlN purity based on the weight of the material, such embodiments would not necessarily also be required to be 100% dense. While it is preferred for AlN purity and product density to both be as close to 100% as possible, the invention does encompass embodiments where AlN purity is greater than product density and embodiments where product density is greater than AlN purity.

Before the pressure is applied, the powders may be treated to increase packing density of the powders in the chamber. For example, the powders may be vibrated using any applicable methods to compact the powders to the extent possible prior to pressing.

Upon completion of the pressing step, the aluminum nitride can be referred to as being in the form of a slug. This aluminum nitride slug generally is a pressed agglomeration of the aluminum nitride powders, and the powders are held together by the compaction of the applied pressure (i.e., without the need for any binder material). Typically, the slug will maintain the general shape of the mold in which the powders were pressed.

After removal from the pressing mold, the aluminum nitride slug is sintered. Notably, the sintering is a binderless sintering meaning that no binding aid or sintering aid is included. As noted above, the pressing step can be carried out using aluminum nitride powders with no additional materials added thereto (apart from any minimal impurities inherent to the powders themselves). Preferably, no additional material is added to the pressed aluminum nitride slug after removal from the press and prior to the sintering step being carried out. Thus, the method can be expressly characterized as excluding addition of specific materials during one or both of pressing and sintering. Such excluded materials may include any of those discussed herein in relation the inventive polycrystalline aluminum nitride material itself.

A variety of means for sintering the aluminum nitride slug may be used according to the present invention so long as the equipment used is suitable for meeting the further processing parameters described herein. In some embodiments, sintering may be carried out using a vacuum furnace. More specifically, a resistance heated vacuum furnace or an inductively heated vacuum furnace could be used. To manage the thermal load during sintering, it can be useful for the furnace to include a chamber of a specific configuration. For example, the furnace could have a water-cooled, double-walled steel chamber that optionally may include insulation therearound or between the walls. In other embodiments, the furnace could have a water-cooled quartz jacket with a susceptor and insulation therearound. Other types of furnaces, particularly furnaces suitable for industrial applications, could be used according to the invention. For example, U.S. Pat. No. 7,678,195 to Schlesser et al. describes and illustrates furnaces (or reactors) that may be useful according to the invention, said document being incorporated herein by reference in its entirety.

In specific embodiments, it is useful for the sintering process to be carried out in an inert atmosphere or, more particularly, a non-oxidizing atmosphere. Specifically, the sintering atmosphere may be any atmosphere that is substantially or completely void of any oxidizing gases (e.g., $O_2$). In some embodiments, it can be useful to provide an artificial atmosphere in the sintering chamber that comprises one or more non-oxidizing gases. Of course, such embodiments would include evacuation of atmospheric (i.e., oxygen-containing) gas from the chamber. The non-oxidizing gas used may include noble gases or any other gas that would not unfavorably react with the aluminum nitride material being sintered. In specific embodiments, nitrogen gas or another inert gas is used.

In some embodiments, the non-oxidizing gas can be filled into the sintering chamber to a specific pressure. In certain embodiments, the non-oxidizing gas is provided to a pressure of up to about 5 atm (0.5 MPa), up to about 4 atm (0.4 MPa), up to about 3 atm (0.3 MPa), up to about 2 atm (0.2 MPa), up to about 1.5 atm (0.15 MPa), up to about 1.25 atm (0.125 MPa), or up to about 1.1 atm (0.11 MPa). In certain embodiments, the non-oxidizing gas is provided at a pressure of about 1 atm (0.1 MPa). In further embodiments, the non-oxidizing gas is provided at a pressure of about 1 atm (0.1 MPa) to about 2 atm (0.2 MPa), about 1 atm (0.1 MPa) to about to about 1.5 atm (0.15 MPa), or about 1 atm (0.1 MPa) to about 1.25 atm (0.125 MPa). In further embodiments, it is possible to carry out the process at lower pressures (i.e., under vacuum). The non-oxidizing gas can be provided at a specific flow rate throughout the sintering process or at only defined periods during the sintering process. Specifically, the non-oxidizing gas can be provided at a rate of about 10 standard cubic centimeters per minute (SCCM) to about 3,000 SCCM, about 25 SCCM to about 2,800 SCCM, about 50 SCM to about 2,500 SCCM, about 75 SCCM to about 2,250 SCCM, or about 100 SCCM to about 2,000 SCCM. In some embodiments, the process may be carried out with substantially no flow (i.e., a stagnant gas atmosphere).

Sintering of the aluminum nitride slug takes place at a significantly elevated temperature sufficient to complete transformation of the aluminum nitride powders into a single, coherent material. In specific embodiments, sintering is carried out by heating the aluminum nitride slug to a maximum temperature. For example, the aluminum nitride slug may be heated to a maximum temperature that is at least about 1,500° C., at least about 1,600° C., at least about 1,700° C., at least about 1,800° C., at least about 1,900° C., at least about 2,000° C., at least about 2,100° C., or at least about 2,200° C. In some embodiments, the maximum sintering temperature is in the range of about 1,500° C. to about 2,500° C., about 1,600° C. to about 2,500° C., about 1,700° C. to about 2,500° C., about 1,800° C. to about 2,500° C., about 1,900° C. to about 2,500° C., about 2,000° C. to about 2,500° C., about 2,100° C. to about 2,500° C., or about 2,100° C. to about 2,400° C.

In certain embodiments, heating to achieve the maximum temperature may be applied in a step-wise manner. In other words, the aluminum nitride slug may be heated to a specific temperature and then held at that temperature (i.e., "soaked") for a defined time before being raised to a greater temperature and held for a defined period of time. Multiple iterations of the step-wise heating could be applied, including 2 iterations, 3 iterations, 4 iterations, 5 iterations, or even more iterations as could be determined as useful in light of the present disclosure. In specific embodiments, the aluminum nitride slug is heated to a first temperature and held for a defined time period prior to being heated to a second temperature and held for a defined period of time. In some embodiments, the second temperature may correspond to the maximum temperature described above. For example, the first temperature may be in the range of about 1,500° C. to about 1,900° C., about 1,600° C. to about 1,800° C., or about 1,650° C. to about 1,750° C.

In alternate embodiments, the amount of time the aluminum nitride slug is soaked at a defined temperature may vary. For example, the slug may be soaked at a defined temperature for a time of at least about 1 minute, at least about 2 minutes, at least about 5 minutes, at least about 10 minutes, at least about 15 minutes, at least about 30 minutes, or at least about 1 hour. Further, the slug may be soaked at a defined temperature for a time of about 5 minutes to about 5 hours, about 10 minutes to about 4 hours, about 15 minutes to about 3 hours, about 30 minutes to about 2 hours, or about 30 minutes to about 1.5 hours. Moreover, the amount of time the aluminum nitride slug is maintained at the maximum temperature may be significantly greater than the amount of time the slug is held at any single temperature that is less than the maximum temperature. For example, the slug may be maintained at the maximum temperature for a time of about 1 hour to about 24 hours, about 2 hours to about 22 hours, about 3 hours to about 20 hours, about 4 hours to about 18 hours, about 5 hours to about 16 hours, about 6 hours to about 14 hours, about 7 hours to about 13 hours, about 8 hours to about 12 hours, or about 9 hours to about 11 hours. In further embodiments, the aluminum nitride slug is maintained at the maximum temperature for a time of at least about 2 hours, at least about 3 hours, at least about 4 hours, at least about 5 hours, at least about 6 hours, at least about 7 hours, at least about 8 hours, or at least about 9 hours.

Heating of the aluminum nitride slug can proceed according to a specific rate, and such rate may be kept constant from ambient temperature to the desired maximum temperature. In some embodiments, heating may follow a specific progression to two or more temperatures including the maximum temperature. More particularly, a specific heating rate may be used to achieve a first temperature, a second heating rate may be used to achieve a second temperature, and further heating rates may be used to achieve further temperatures until the maximum temperature is reached. Specifically, a heating algorithm may be applied wherein two or more different heating rates may be used to achieve successively greater temperatures. In certain embodiments, the heating rates may provide for successively slower heating. In other embodiments, the heating rates may provide for successively faster heating. In further embodiments, the heating rates may alternate between slower and faster heating.

Heating rates can vary from about 0.1° C./minute to about 20° C./minute. More particularly, desirable heating rates can be about 0.1° C./minute to about 10° C./minute, about 0.1° C./minute to about 9° C./minute, about 0.1° C./minute to about 8° C./minute, about 0.1° C./minute to about 7° C./minute, about 0.1° C./minute to about 6° C./minute, about 0.1° C./minute to about 5° C./minute, about 0.1° C./minute to about 4° C./minute, about 0.1° C./minute to about 3° C./minute, about 0.1° C./minute to about 2° C./minute, about 0.1° C./minute to about 1° C./minute. In specific embodiments, any of the following heating rates may be applied to constant heating or to a defined heating algorithm in the inventive methods: 0.1° C./minute, 0.2° C./minute, 0.3° C./minute, 0.1° C./minute, 0.4° C./minute, 0.5° C./minute, 0.6° C./minute, 0.7° C./minute, 0.8° C./minute, 0.9° C./minute, 1.0° C./minute, 1.2° C./minute, 1.4° C./minute, 1.6° C./minute, 1.8° C./minute, 2.0° C./minute, 2.5° C./minute, 3.0° C./minute, 4.0° C./minute, 5.0° C./minute, 6.0° C./minute, 7.0° C./minute, 8.0° C./minute, or 10.0° C./minute. Slower heating rates may be particularly preferred to achieve proper sintering according to the invention wherein sintering aids and binding aids are not used.

Non-limiting examples of heating algorithms that could be applied according to the present invention are as follows:
  a) heating at a rate of about 5° C./minute, about 4° C./minute, about 3° C./minute, about 2° C./minute, about 1° C./minute, about 0.8° C./minute, or about 0.6° C./minute to a first soaking temperature of about 1,500° C., about 1,550° C., about 1,600° C., about 1,650° C., about 1,700° C., about 1,750° C., about 1,800° C., about 1,850° C., or about 1,900° C., soaking at the first temperature for at time of at least about 1 minute, at least about 2 minutes, at least about 5 minutes, at least about 10 minutes, at least about 30 minutes, or at least about 1 hour, heating at a rate of about 2° C./minute, about 1° C./minute, about 0.8° C./minute, about 0.6° C./minute, about 0.4° C./minute, about 0.2° C./minute, or about 0.1° C./minute to a maximum temperature that is greater than the first soaking temperature, and soaking at the maximum temperature for a time of at least about 2 hours, at least about 3 hours, at least about 4 hours, at least about 5 hours, at least about 6 hours, at least about 7 hours, at least about 8 hours, or at least about 9 hours;

b) applying algorithm a) from above wherein, after completion of the soak at the first temperature and prior to heating to the maximum temperature, the algorithm further includes heating at a rate of about 4° C./minute, about 3° C./minute, about 2° C./minute, about 1° C./minute, about 0.8° C./minute, about 0.6° C./minute, or about 0.4° C./minute to a second soaking temperature of about 1,700° C., about 1,750° C., about 1,800° C., about 1,850° C., about 1,900° C., about 1,950° C., about 2,000° C., about 2,050° C., or about 2,100° C., and soaking at the second temperature for at time of at least about 1 minute, at least about 2 minutes, at least about 5 minutes, at least about 10 minutes, at least about 30 minutes, or at least about 1 hour, wherein the maximum temperature is greater than the second soaking temperature; and c) applying algorithm b) from above wherein, after completion of the soak at the second temperature and prior to heating to the maximum temperature, the algorithm further includes heating at a rate of about 3° C./minute, about 2° C./minute, about 1° C./minute, about 0.8° C./minute, about 0.6° C./minute, about 0.5° C./minute, or about 0.2° C./minute to a third soaking temperature of about 1,900° C., about 1,950° C., about 2,000° C., about 2,050° C., about 2,100° C., about 2,150° C., about 2,200° C., about 2,250° C., or about 2,300° C., and soaking at the second temperature for at time of at least about 1 minute, at least about 2 minutes, at least about 5 minutes, at least about 10 minutes, at least about 30 minutes, or at least about 1 hour, wherein the maximum temperature is greater than the third soaking temperature.

Heating rate also can be related to the size of the aluminum nitride boule being prepared. In various embodiments, it can be desirable to reduce heating rate as the size of the boule increases. Thus, the heating algorithm can provide for applying a heating rate that is inversely proportional to the size of the boule being prepared.

After the temperature soak at the given temperature or temperatures (i.e., at only the maximum temperature or at one or more further temperatures below the maximum temperature), the sintered aluminum nitride slug is cooled to ambient temperature. Cooling of the sintered aluminum nitride slug may particularly be carried out at a controlled rate. A single cooling rate may be used throughout cooling to ambient, or two or more different cooling rates maybe combined in a cooling algorithm similar to the heating algorithm discussed above. For example, any of the following cooling rates could be used alone or in combination: 0.1° C./minute, 0.2° C./minute, 0.3° C./minute, 0.1° C./minute, 0.4° C./minute, 0.5° C./minute, 0.6° C./minute, 0.7° C./minute, 0.8° C./minute, 0.9° C./minute, 1.0° C./minute, 1.2° C./minute, 1.4° C./minute, 1.6° C./minute, 1.8° C./minute, 2.0° C./minute, 2.5° C./minute, 3.0° C./minute, 4.0° C./minute, 5.0° C./minute, 6.0° C./minute, 7.0° C./minute, 8.0° C./minute, or 10.0° C./minute. In other embodiments, cooling rate may range from about 0.1° C./minute to about 20° C./minute, about 0.2° C./minute to about 10° C./minute, or about 0.5° C./minute to about 5° C./minute.

After ambient temperature is achieved, one or more further processing steps may be carried out. For example, in some embodiments, the sintered, polycrystalline aluminum nitride material can be subjected to one or more shaping steps.

In certain embodiments it can be desirable to shape the sintered aluminum nitride boule into a form from which one or more substantially uniform divisions can be formed. Specifically, the sintered aluminum nitride material may be ground to the shape of a cylinder with a uniform outside diameter. Of course, other shapes could be formed depending upon the desired end use of the material. Such grinding may be carried out using a diamond wheel grinder (e.g., on a Bridgeport milling machine, available from Hardinge, Inc., Elmira, N.Y.). In other embodiments, a computer numerical control (CNC) grinding tool (e.g., a Solaris Grinder, available from Weldon Solutions, York Pa.) with a diamond wheel may be useful for achieving a desired shape with a defined outer diameter (OD).

In further embodiments, the sintered aluminum nitride material may be cut into one or more substantially uniform divisions. For example, when the sintered aluminum nitride material is cylindrically shaped, one or more substantially round wafers of a defined thickness may be sliced from the sintered aluminum nitride cylinder. For example, wafering may be carried out using a diamond wafering blade on a water cooled saw or with a slurry-based multi-wire saw (e.g., a Takatori 812 SD saw using silicon carbide abrasive in a Silcut slurry). The sintered aluminum nitride may be sliced into wafers having a thickness of about 0.1 mm to about 25 mm, about 0.2 mm to about 20 mm, about 0.3 mm to about 15 mm, about 0.4 mm to about 10 mm, about 0.5 mm to about 7 mm, about 0.6 mm to about 5 mm, about 0.7 mm to about 4 mm, or about 0.8 mm to about 2 mm.

The sintered aluminum nitride material (either in the bulk form removed from the sintering step or in a processed state as described above—e.g., in the form of a wafer with substantially flat, opposing surfaces) can be subjected to a polishing step. In preferred embodiments, the sintered aluminum nitride material is mechanically polished. In specific embodiments, the sintered aluminum nitride material may be subjected to mechanical shaping by lapping or grinding, and a preferred surface finish on the material may be developed through mechanical polishing. Although polishing alone could be used, lapping or grinding may be beneficial to facilitate preparation of the smoothest possible substrate surface.

Wafer shaping (e.g., lapping or grinding) followed by polishing are processes by which material is precisely removed from the sintered aluminum nitride material to produce a desired dimension, surface finish, and/or shape. Lapping and grinding are operations understood to refer to the removal of material to produce a smooth, flat, unpolished surface. The lapping and grinding processes can be used to produce dimensionally accurate specimens to high tolerances. The lapping plate typically rotates at a relatively low speed (e.g., less than about 100 rpm, less than about 90 rpm, less than about 80 rpm, less than about 70 rpm, or less than about 60 rpm), and a mid-range abrasive particle (e.g., about 10 µm to about 100 µm, about 15 µm to about 100 µm, about 20 µm to about 90 µm, or about 25 µm to about 80 µm) is typically used. Lapping and grind can remove subsurface damage caused by sawing or grinding and produces the required thickness and flatness. Polishing is understood to refer to the removal of material to produce a scratch-free, specular surface using fine (e.g., less than about 10 µm, less than about 8 µm, less than about 6 less than about 5 µm, or less than about 4 µm) abrasive particles. Polishing is typically done at very low speeds using either polishing cloths, abrasive films, or specially designed lapping plates. Polishing with a cloth or lapping plate requires the use of free abrasive, and is a very low damage process when performed properly.

In certain embodiments lapping, grinding, and/or polishing can comprise multiple steps wherein abrasive particles size can be systematically decreased. For example, lapping could be carried out in 2, 3, 4, 5, or even more steps wherein each step uses an abrasive of different grit (or particle size). Preferably, each successive lapping step uses a smaller particle size abrasive than the preceding step. Similarly, polishing could be carried out in 2, 3, 4, 5, or even more steps wherein each step uses an abrasive of different grit (or particle size). Preferably, each successive polishing step uses a smaller particle size abrasive than the preceding step.

Wafer shaping specifically may include grinding the wafers using a substrate grinding tool, such as a Strasbaugh 7 AF grinder. Such grinding may be used to reduce the wafer thickness by at least about 0.01 mm, at least about 0.025 mm, at least about 0.05 mm, at least about 0.075 mm, at least about 0.1 mm, at least about 0.125 mm, at least about 0.15 mm, at least about 0.175 mm, or at least about 0.2 mm, and thus produce a substantially flat surface, as noted above.

The grinding and polishing step preferably results in an aluminum nitride substrate having a surface morphology in line with the characteristics previously described herein. It is to be noted that although specific polishing techniques can provide good smoothness results, the present invention arises from the discovery that the combination of the polishing techniques described herein with the pressing and sintering steps provides a material that is capable of being polished to the excellent results described herein. It is not believed that other polycrystalline aluminum nitride materials prepared by methods other than the pressing and sintering methods described herein could be polished to the same surface morphology described herein even using the same lapping, grinding, and polishing steps of the present invention. In particular, polycrystalline materials prepared using binding or sintering aids would not be expected to be able to achieve the same surface morphology as described herein because of the inclusion of the non-aluminum nitride particles that can be dislodged during polishing and actually decrease smoothness of the aluminum nitride substrate.

By carrying out the above steps, it thus is possible according to the invention to prepare polycrystalline aluminum nitride substrates that exhibit highly desirable properties. For example, in preferred embodiments, products of excellent characteristics can be achieved through application of the following processing conditions. The aluminum nitride powder used preferably will have a purity of at least 98%. The aluminum nitride powder also preferably has a surface area of about 1 to about 10 $m^2/g$, or about 2 to about 5 $m^2/g$. Within these ranges, an average particle surface area of about 3.5 $m^2/g$ may correspond to powder having an average size of about 1-2 μm—e.g., a particle size distribution such that about 50% by weight of the particles are less than about 1 μm in size and about 90% by weight of the particles are less than about 2 μm in size. The aluminum nitride particles (in the express absence of binders or sintering aids) preferably are pressed at a pressure of about 20,000 psi to about 60,000 psi to form a self-supporting pressed boule. The sintering step thereafter preferably is carried out using an inverse temperature ramping wherein the heating rate decreases as the heating temperature at each ramp increases. For example, for preparation of a boule having a diameter of about 200 mm (about 8 inches), it can be preferable for heating rate to be less than about 2° C. per minute. For smaller size boules, however, the heating rate can be significantly greater.

EXPERIMENTAL

The present invention is more fully illustrated by the following examples, which are set forth to illustrate the present invention and provide full disclosure and are not to be construed as limiting thereof.

EXAMPLE 1

Formation of 35 mm Diameter Polycrystalline Aluminum Nitride Wafers Having a Thickness of 2 mm A highly dense, polycrystalline aluminum nitride substrate with excellent surface morphology was prepared according to the following method. Commercially available aluminum nitride powder with a purity of about 99.1% and a specific surface area of about 3.5 $m^2/g$ was poured into a cylindrical shaped rubber mold. The powder was compacted by vibrating the assembly on a vibrating table and allowing the powder to settle to a compacted state. A lid was placed on the mold, and the assembly was submerged in an aqueous solution in the chamber of a cold isostatic press (CIP). The CIP chamber was pressurized to about 30,000 PSI (207 MPa) at a rate of about 5,000 PSI/minute (0.57 MPa/s). Upon reaching a chamber pressure of about 30,000 PSI (207 MPa), the press was held at pressure for about 1-2 minutes, and the chamber pressure was then reduced to atmospheric pressure in a time of less than about 1 minute. The mold was removed from the CIP chamber, and the pressed slug of aluminum nitride was removed from the mold.

The aluminum nitride slug was placed in an inductively heated vacuum furnace with a water cooled quartz jacket having a susceptor and insulation to manage the thermal load of the furnace. The closed furnace chamber with the aluminum nitride slug inside was evacuated of ambient gas and backfilled with $N_2$ to a pressure of about 1 atm (0.1 MPa). The furnace then was heated to approximately 1,700° C. and soaked at temperature for about 1 hour. The temperature then was raised to approximately 2,220° C., and the aluminum nitride slug was soaked at temperature for about 10 hours with an $N_2$ flow rate of about 100 SCCM. After the temperature soak, the chamber was cooled to ambient temperature, and the sintered aluminum nitride material was removed from the furnace.

The sintered aluminum nitride material was ground to a uniform OD using a diamond wheel on a Bridgeport mill Once the cylindrically shaped material was appropriately rounded, the aluminum nitride cylinder was sliced into individual wafers using a 6 inch (152 mm) diameter diamond wafering blade on a water cooled saw with a feed rate of 0.25 inches/minute (0.1 mm/sec) and a rotation speed of 4,000 RPM. The saw used a low concentration, metal bonded diamond wafering blade (available from Allied High Tech). The individual wafers formed were 35 mm in diameter and 2 mm thick.

The sliced polycrystalline aluminum nitride material, now in the form of individual wafers, was mounted on hot mounting wax on a stainless steel polishing fixture for grinding and polishing Grinding was carried out with silicon carbide abrasive paper disks of decreasing grit size in order to obtain a globally planarized surface on the sintered aluminum nitride wafers. Successive grinding steps were performed with 7 PSI pressure at 50 RPM using the following combinations of abrasive paper grit size and lapping time: 180 grit (4 minutes), 240 grit (2 minutes), 400 grit (2 minutes), and 600 grit (2 minutes).

After grinding, polishing was performed with 7 PSI (48 KPa) pressure at 50 RPM using a chemotextile polishing cloth with aqueous aluminum oxide suspensions containing abrasives of decreasing size in order to obtain a uniform, smooth surface. Polishing with 5 μm aluminum oxides was carried out for 40 minutes, and polishing with 1 μm aluminum oxides was carried out for 60 minutes. The finally polished sintered, polycrystalline, aluminum nitride substrates were unmounted from the polishing fixture, and any remaining mounting wax was cleaned off using acetone. The finished aluminum nitride substrate was evaluated for rms roughness using a Dektak 150 Surface Profiler scanning a sample area of 1,000 μm×200 μm. It was evaluated to have a surface roughness rms of less than 80 nm using the rms algorithm software that was integral to the profilometer's software control package. Pit density was estimated by counting the number of pits (as defined herein) within the visible sampling area. The results were corroborated using DIC microscopy by counting the number of pits visible within a calibrated microscope view field and correlating the number to a density in pits/cm$^2$. The pit density was calculated to be less than $1\times10^4$ cm$^{-2}$.

EXAMPLE 2

Formation of 200 Mm Diameter Polycrystalline Aluminum Nitride Wafers Having a Thickness of 750 μm A highly dense, polycrystalline aluminum nitride substrate with excellent surface morphology was prepared according to the following method. Commercially available aluminum nitride powder with a purity of about 99.1% and a specific surface area of about 3.5 m$^2$/g was poured into a cylindrical shaped rubber mold. The powder was compacted by vibrating the assembly on a vibrating table and allowing the powder to settle to a compacted state. A lid was placed on the mold, and the assembly was submerged in an aqueous solution in the chamber of a cold isostatic press (CIP). The CIP chamber was pressurized to about 30,000 PSI (207 MPa) at a rate of about 5,000 PSI/minute (0.57 MPa/s). Upon reaching a chamber pressure of about 30,000 PSI (207 MPa), the press was held at pressure for about 5 minutes, and the chamber pressure was then reduced to atmospheric pressure in a time of less than about 1 hour. The mold was removed from the CIP chamber, and the pressed slug of aluminum nitride was removed from the mold.

The aluminum nitride slug was placed in a resistively heated vacuum furnace with a water cooled double walled steel chamber and insulation around the heater to manage the thermal load of the furnace. The closed furnace chamber with the aluminum nitride slug inside was evacuated of ambient gas and backfilled with N$_2$ to a pressure of about 1.1 atm (0.11 MPa). The furnace then was heated to approximately 1,700° C. at a rate of 0.8° C./min, then heated to 2,000° C. at a rate of 0.4° C./min, then heated to 2100° C. at a rate of 0.2° C./min Once the temperature was raised to approximately 2,100° C., the aluminum nitride slug was soaked at temperature for about 5 hours with a N$_2$ flow rate of about 2 SLM. After the temperature soak, the chamber was cooled to ambient temperature at a rate of 0.7° C./min, and the sintered aluminum nitride material was removed from the furnace.

The sintered aluminum nitride material was ground flat on each end with a surface grinding tool, and then the OD was ground to a uniform diameter using a diamond wheel on a CNC OD grinding tool such as a Weldon Solutions Solaris Grinder. Once the cylindrically shaped material was appropriately rounded, the aluminum nitride cylinder was grooved with a diamond grinding wheel to form a shape which would serve as a notch in the sliced wafers.

Once the groove was formed in the material, the material was sliced into individual wafers using a slurry based multi-wire saw such as a Takatori 812SD using 800 grit green silicon carbide abrasive in a Sil-cut slurry with about 1 kg of abrasive per liter of slurry. A variable speed cut rate ranging from 1-6 mm/hr and averaging 3 mm/hr was used with a wire feed speed of approximately 300 ft/min (1.5 m/s) with 180 μm diameter wire and a spindle head rocking angle of 1.5° to 3.0°. Wafer blanks were cut to a thickness of about 1,100 μm.

The sliced aluminum nitride material, now in the form of individual wafer blanks, was ground flat using a substrate grinding tool such as a Strasbaugh 7 AF to a thickness of about 765 μm thick by removing 167.5 μm from each side of the wafer using a diamond coated wheel. The wafer was then polished on a single wafer polishing tool such as a SpeedFam Auriga CMP tool by first performing a stock removal step on each side, then a final polish on each side of the wafer. The wafers were then edge ground to form a bevel on the perimeter, and laser scribed to mark their individual serial number. Shape characterization of the polished wafers was then performed using a SigmaTech UltraMap S-200FP to measure TTV, Bow, Warp, Maximum Thickness, Minimum Thickness, and Average Thickness.

Optical characterization was performed on the wafer surfaces to count defect densities. Images of the wafer surfaces were recorded and optical recognition software, such as Image-J develop by the National Institute of Health, was used for counting defects. Defect densities were recorded to be as low as less than 200 cm$^{-2}$. Finally, the wafers were cleaned with acetone on both sides and boxed in standard semiconductor packages.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific teams are employed herein, they are used in a generic and descriptive sense only and not for purposes of limitation.

The invention claimed is:

1. A polycrystalline aluminum nitride substrate, said substrate being prepared according to a method comprising:
    pressing aluminum nitride powder to form a pressed aluminum nitride slug;
    sintering the pressed aluminum nitride slug material by heating to a maximum temperature of at least about 1,500° C. at a heating rate that does not exceed 0.1° C./minute to 10° C./minute in a non-oxidizing atmosphere to form a sintered aluminum nitride boule with a thickness of at least 5 cm and with a diameter or length or width of at least 5 cm; and
    mechanically polishing at least a portion of the sintered aluminum nitride boule to form a polycrystalline aluminum nitride substrate,
such that the so-formed substrate has a relative density of at least about 98%, an aluminum nitride purity of at least about 98% by weight, an rms surface roughness of less than about 80 nm, and a defect density of less than about 1,000 cm$^{-2}$.

2. An article of manufacture comprising a polycrystalline aluminum nitride substrate according to claim 1.

3. The article of manufacture according to claim 2, wherein the article is selected from the group consisting of heat sinks, electrical insulator parts, handle wafers, carrier wafers, and layer transfer substrates.

4. The article of manufacture according to claim 2, wherein the article is selected from the group consisting of electronic devices, microelectronic devices, optoelectronic devices, and telecommunication devices.

5. A polycrystalline aluminum nitride substrate having a relative density of at least about 98%, an aluminum nitride purity of at least about 98% by weight, an rms surface roughness of less than about 80 nm, and a defect density of less than about 1,000 cm$^{-2}$.

6. The polycrystalline aluminum nitride substrate according to claim 5, wherein the substrate is substantially free of any sintering aids and binders.

7. A product of manufacture comprising a polycrystalline aluminum nitride substrate according to claim 6.

8. The product of manufacture according to claim 7, wherein the article is selected from the group consisting of heat sinks, electrical insulator parts, handle wafers, carrier wafers, and layer transfer substrates.

9. The article of manufacture according to claim 7, wherein the article is selected from the group consisting of electronic devices, microelectronic devices, optoelectronic devices, and telecommunication devices.

10. A polycrystalline aluminum nitride boule having a relative density of at least about 98%, an aluminum nitride purity of at least about 98% by weight, a thickness of at least 5 cm, and a diameter or length or width of at least 5 cm.

11. The polycrystalline aluminum nitride boule of claim 10, wherein the boule has a thickness of at least about 5.0 cm and a diameter of at least about 5.0 cm.

12. The polycrystalline aluminum nitride boule of claim 10, wherein the boule is substantially free of any sintering aids and binders.

* * * * *